United States Patent [19]
Koscik

[11] 3,836,269
[45] Sept. 17, 1974

[54] CABLE SEALING GROMMET

[75] Inventor: Richard Allen Koscik, Schaumburg, Ill.

[73] Assignee: Illinois Tool Works Inc., Chicago, Ill.

[22] Filed: Sept. 26, 1973

[21] Appl. No.: 400,961

[52] U.S. Cl.................... 403/197, 285/162, 16/2
[51] Int. Cl............................................. F16b 9/02
[58] Field of Search...... 403/197, 195, 194; 248/56; 339/103 B; 285/162; 16/2; 174/153 G; 74/501 P, 501 R

[56] References Cited
UNITED STATES PATENTS

| | | | |
|---|---|---|---|
| 2,277,637 | 3/1942 | Eby | 16/2 |
| 3,056,852 | 10/1962 | Sachs | 16/2 |
| 3,222,093 | 12/1965 | Simmons | 285/162 |

Primary Examiner—Andrew V. Kundrat
Attorney, Agent, or Firm—Olson, Trexler, Wolters, Bushnell & Fosse, Ltd.

[57] ABSTRACT

The present invention relates generally to improvements in grommets of the type adapted to accommodate cables and more particularly to grommets adapted to sealingly encircle a cable and designed for assembly after the cable has been mounted in position. The present invention has a very practical application for use with a hood release cable which traverses the fire wall of an automobile. The sealing and strain relief grommet disclosed herein includes a pair of similar hingedly connected plastic sections, each of said sections presenting a peripheral surface conforming substantially with one half of a cone periphery. Sealer sections for engaging one side of a work piece or panel are secured as a unit to complementary flange sections of the plastic half conical sections. Yieldable abutment means associated with the plastic half sections serve to resist axial dislodgment of the grommet after complete insertion thereof within a panel aperture.

8 Claims, 12 Drawing Figures

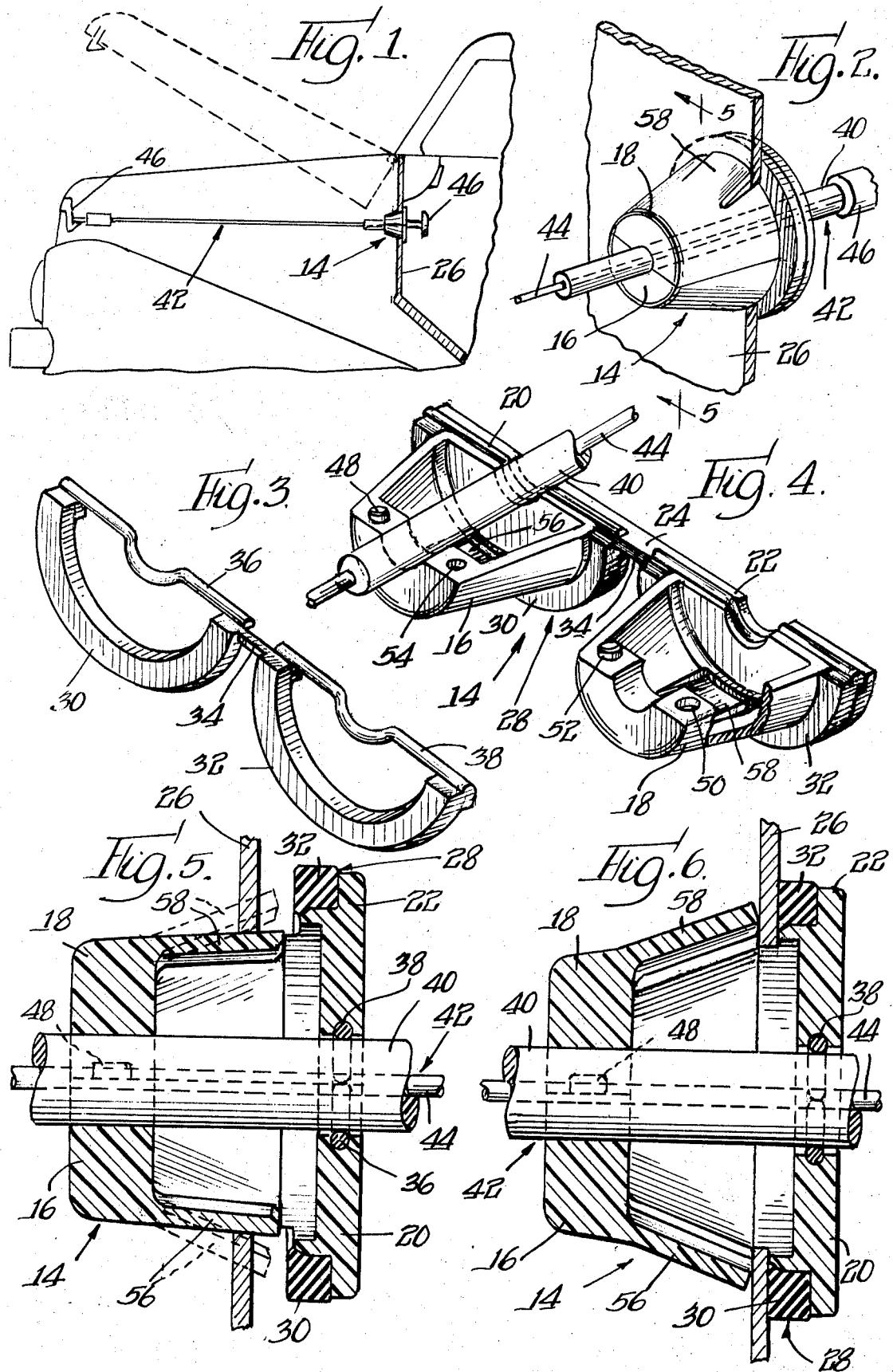

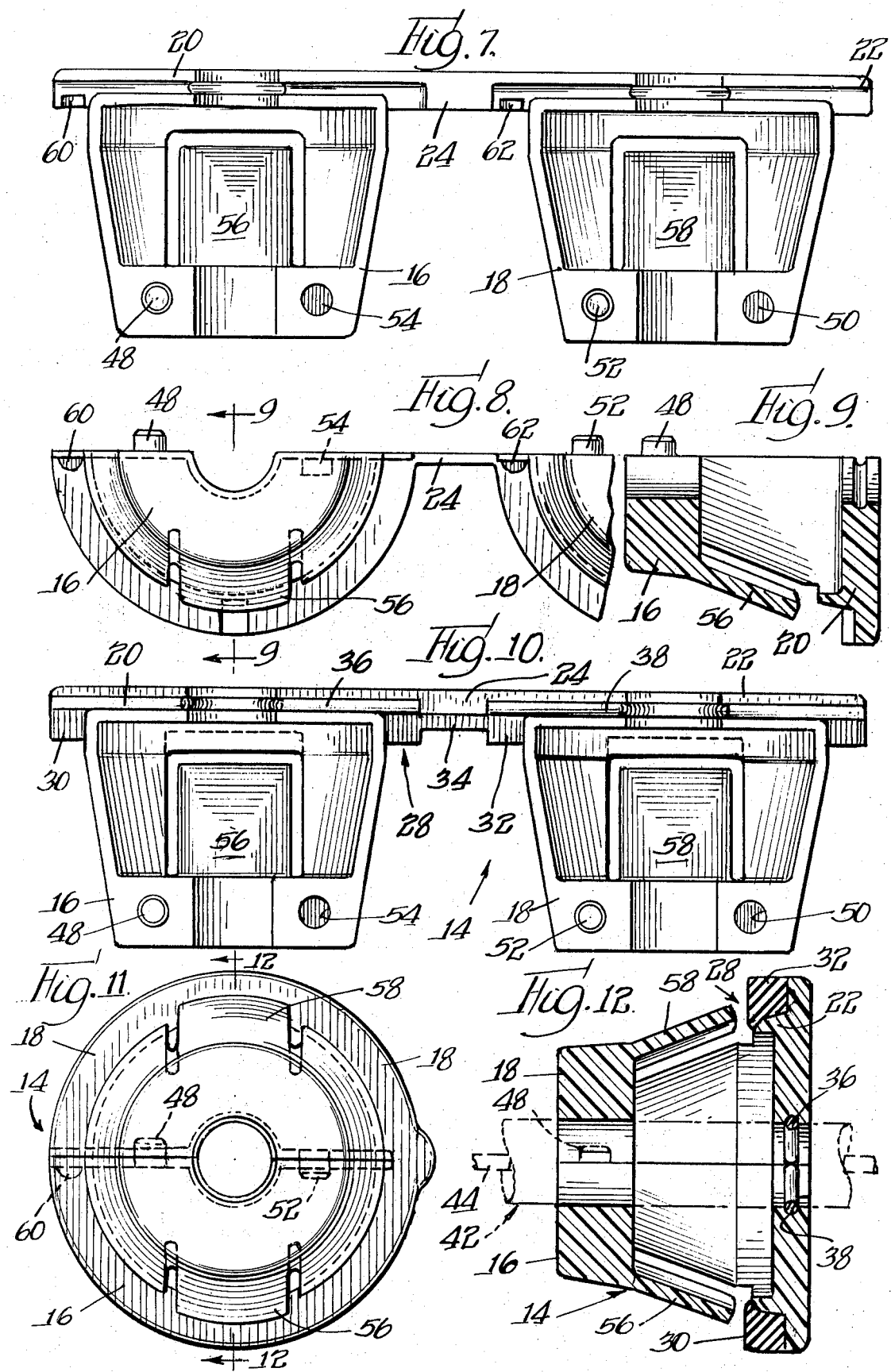

3,836,269

CABLE SEALING GROMMET

SUMMARY OF THE INVENTION

One of the problems incident to the use of sealing and strain relief grommets used in association with cables and the like is that of applying the grommet to the cable after the cable has been mounted in position. It has been found practical, for example, to mount a hood release cable traversing the fire wall of an automobile before the application of a grommet.

It is an object of the present invention to provide a sealing and strain relief grommet which may be applied to a previously mounted cable, such as the aforesaid hood release cable, by lateral as distinguished from the conventional axial assembly of the grommet with the cable.

More specifically, the present invention contemplates a grommet of the type set forth above which may be folded over a cable into sealing engagement therewith and subsequently inserted within a panel aperture.

Still more specifically, the invention contemplates a grommet as referred to above which is of extremely simple and practical construction and which includes in unitary association therewith a sealing member or gasket which is adapted when the grommet is fully inserted within a work or panel aperture to clampingly and sealingly impinge a surface of said panel.

BRIEF DESCRIPTION OF THE DRAWINGS

The foregoing and other objects and advantages will be more apparent from the drawings hereof wherein:

FIG. 1 is a fragmentary semi-schematic view of the hood end of an automobile and an associated hood cable equipped with a strain relief sealing grommet of the type contemplated by the present invention;

FIG. 2 is an enlarged perspective view of a grommet constructed in accordance with the teachings of the present invention disclosed in sealing engagement with an apertured panel member;

FIG. 3 is a perspective view of the hingedly connected sealing or gasket sections disengaged from the hingedly connected plastic sections;

FIG. 4 is a perspective view of the grommet illustrated in FIG. 2 in open position for accommodating a laterally applied cable;

FIG. 5 is an enlarged vertical sectional view taken substantially along the line 5—5 of FIG. 2 disclosing the initial and partial insertion of the grommet within a panel aperture;

FIG. 6 is a sectional view similar to FIG. 5 disclosing the grommet after it has been fully inserted within the panel aperture;

FIG. 7 is an enlarged plan view of the open grommet sections before the sealing gasket has been associated therewith;

FIG. 8 is an end elevational view of the grommet sections shown in FIG. 7;

FIG. 9 is a detail sectional view taken substantially along the line 9—9 of FIG. 8;

FIG. 10 is a view similar to FIG. 7 after the rubber-like sealing element or gasket has been applied as a unit to the flange section of the grommet;

FIG. 11 is an end elevational view of the grommet illustrated in FIG. 10 after the two semi-conical sections have been folded together; and FIG. 12 is a central sectional view taken substantially along the line 12—12 of FIG. 11.

DESCRIPTION OF A PREFERRED EMBODIMENT

Referring now to the drawings more in detail wherein like numerals have been employed to designate similar parts throughout the various views, a sealing and strain relief grommet embodying the present invention is designated generally by the numeral 14. The grommet 14 is comprised of two parts, one of which includes complementary plastic half sections 16 and 18 having integral flange sections 20 and 22 having gasket accommodating surfaces spaced axially from the larger diameter of each of the plastic half sections 16 and 18 respectively.

The flange sections 20 and 22 are connected by a hinge section 24, FIGS. 4, 7, 8 and 10. The degree of axial spacing of the flanges 20 and 22 from the larger extremity of the complementary plastic half sections 16 and 18 is determined by the thickness of the panel, as for example, a fire wall panel 26, which is apertured to accommodate the grommet 14. In this connection, it will be noted that the peripheral surfaces of the plastic half sections 16 and 18 conform substantially with one half of a conical surface so that when the sections are folded together as illustrated in FIG. 2, a complete peripheral conical surface is presented for insertion within an aperture of the panel or fire wall 26.

The second part of the above-described grommet 14 is in the nature of a rubber-like annular gasket or seal designated generally by the numeral 28. The seal or gasket 28 is of integral construction and includes two half circular sections 30 and 32. These half circular sections 30 and 32 are integrally connected by a hinge section 34. Formed integral with and traversing the semi-circular gasket section 30 is an elongate sealing member 36, and a similar elongate sealing member 38 is formed integral with and traverses the open side of the gasket section 32. At this point, it should be understood that the elements forming the sealing member or gasket 28 are rubber-like and are adhesively secured to the flange sections 20 and 22 as clearly shown in FIGS. 2 to 6 inclusive. Thus, the two parts of the grommet 14, namely the conical plastic sections and the rubber-like gasket sections present a unitary construction. It will be noted from FIGS. 5 and 6 that the elongate sealing sections 36 and 38 integral with the complementary semi-circular gasket sections 30 and 32 respectively are designed to sealingly engage each other when the grommet is shifted from the open position shown in FIGS. 4 and 10 to the closed cable encircling position shown in FIGS. 2 and 6. Each of the elongate gasket sections 36 and 38 have a central arcuate portion adapted to sealingly engage the casing 40 of a cable designated generally by the numeral 42. A conventional core 44 longitudinally shiftable within the cable casing 40 is connected at one extremity to a release knob 46 on the dashboard or fire wall 26 and the opposite extremity is connected with a latch device 46, FIG. 1.

To assure axial alignment of the two semi-conical sections 16 and 18, a protuberance 48 on the section 16 is adapted to interlock with a complementary recess or detent 50 on the section 18. Likewise, a similar protuberance, 52, on the section 18 is adapted to interlock with a complementary aperture 54 in section 16, FIG. 4. When the sections 16 and 18 are folded together as illustrated in FIGS. 2, 5 and 6, both sections 16 and 18 are in absolute alignment and the gasket sections 30 and 32 together with their elongate portions 36 and 38 provide an effective seal between the chamber inside the automobile hood and the area occupied by the driver.

The semi-conical sections 16 and 18 are longitudinally slit to provide radially yieldable locking sections 56 and 58. These sections 56 and 58 normally project beyond the conical periphery of the grommet 14 and upon initial insertion of the grommet within a panel aperture, said sections or fingers will be collapsed to the position shown in FIG. 5. When the grommet has been completely inserted within the panel aperture, these fingers will spring outwardly as shown in FIG. 6 and will cause firm impingement of the rubber-like gasket sections 30 and 32 with one side of the panel. In order more effectively to assure firm fixed abutment of the semi-circular gasket members 30 and 32, the plastic flanges may be provided with indentations 60 and 62, FIG. 7. The presence of these depressions or recesses in the flange sections enables the relatively soft rubber-like gasket material to become more effectively interlocked as a unit with the flanges 20 and 22.

From the foregoing description, it will be apparent that the present invention contemplates a sealing and strain relief grommet of very practical design. As above-mentioned, the hingedly connected sections of the grommet make it possible to apply the device to a cable after the cable has actually been mounted in position. This has a very practical application to automobile hood release cables and the like wherein the cable is installed before the grommet is assembled. The two parts which comprise the grommet, namely the insertable plastic device and the sealing gasket adhered thereto may be handled as a single unit thereby facilitating assembly of the grommet with the cable. Also, the grommet of the present invention may be produced very economically by practicing conventional modling methods.

While for purposes of illustration, one embodiment of the invention has been disclosed herein, it should be understood that modifications and changes are contemplated which fall within the sprit and scope of the appended claims.

The invention is claimed as follows:

1. A unitary cable sealing grommet including complementary plastic half sections, each presenting a peripheral surface conforming substantially with one-half of a cone, a flange section formed integral with each of said plastic half conical sections and having a portion spaced axially a predetermined distance from the extremity of the larger diameter of said half conical sections, flexible hinge means peripherally joining said half sections in the vicinity of the larger diameter thereof, said flexible hinge means serving to permit said plastic half sections and flange sections to be shifted from an open cable accommodating position to a closed cable encircling position, sealer gasket sections secured as a unit to plural faces on each of said flange sections, said sealer gasket sections, when said half sections are moved into association with each other, providing a seal for clamping engagement with one side of an apertured panel, and yieldable abutment means associated with said plastic half sections for engaging the opposite side of said panel to resist axial dislodgment of said grommet therefrom after said grommet has been fully inserted within a panel aperture.

2. A unitary cable sealing grommet as set forth in claim 1, wherein the sealer sections and plastic half sections are hingedly connected.

3. A unitary cable sealing grommet as set forth in claim 1, wherein said sealer sections comprise hingedly connected substantially semi-circular members adhered to said flange sections.

4. A unitary cable sealing grommet as set forth in claim 1, wherein said half conical sections are provided with interlocking means to assure axial alignment of said sections when said sections are moved into association with each other.

5. A unitary cable sealing grommet as set forth in claim 1, wherein the plastic conical half sections present transverse edges adapted to be moved into abutting relation when said half sections are in closed position, and the sealer sections include portions associated with said transverse edges to provide a seal in the vicinity thereof.

6. A unitary cable sealing grommet as set forth in claim 5, wherein said sealing sections include portions for impinging the periphery of a complementary cable when said half sections are in closed position.

7. A unitary cable sealing grommet as set forth in claim 1, wherein the sealing sections include semi-circular portions and elongate elements traversing the opposite extremity of each semi-circular portion to provide a seal between the conical half sections when said sections are in closed position.

8. A unitary cable sealing grommet as set forth in claim 7, wherein said elongate portions of the sealing section include arcuate portions for sealingly engaging the periphery of a cable when said half sections are in closed position.

* * * * *